United States Patent [19]
Dian et al.

[11] 3,768,433
[45] Oct. 30, 1973

[54] SIDE REFLECTORS FOR BICYCLES AND THE LIKE

[75] Inventors: Walter Dian, Downers Grove; Gerald Golden, Highland Park, both of Ill.

[73] Assignee: Excel Incorporated, Franklin Park, Ill.

[22] Filed: Aug. 10, 1972

[21] Appl. No.: 279,480

[52] U.S. Cl................... 116/28 R, 40/129 C, 350/97
[51] Int. Cl........................................................ B60q
[58] Field of Search........................ 116/28, 35, 114; 350/97, 98, 99, 104; 40/129 C

[56] References Cited
UNITED STATES PATENTS
2,361,287   10/1944   Gustin................................... 350/98
FOREIGN PATENTS OR APPLICATIONS
458,241   7/1950   Italy...................................... 116/28

Primary Examiner—Louis J. Capozi
Attorney—Benjamin H. Sherman et al.

[57] ABSTRACT

Side reflector assemblies for bicycles having reflective surfaces on both sides of the reflector assembly and mounted on the bicycle to reflect light from both sides of the bicycle without interference from the rider. The internal faceted reflective faces of the reflectors are sealed by the mounting means therefor, and the reflectors are clamped to a bar of the bicycle adjacent the front of the bicycle and to the angular bar forming a mounting for the seat post along the upper portion thereof. This so positions the reflector that the two reflectors can be viewed from both sides of the bicycle with a minimum amount of interference from the legs and garments of the rider.

4 Claims, 3 Drawing Figures

PATENTED OCT 30 1973 3,768,433

SIDE REFLECTORS FOR BICYCLES AND THE LIKE

FIELD OF THE INVENTION

Bicycle reflector of the type found in Class 350.

BACKGROUND, SUMMARY AND ADVANTAGES OF INVENTION

Safety reflectors for bicycles are required under many state laws, and such states as California not only require that the reflector be positioned to reflect rays of light from the rear of the bicycle, but also from the pedals and sides of the bicycle. This has been complied with by placing reflectors on the pedals, but is not entirely satisfactory since there is insufficient reflective surface at the sides of the pedals and the shoes or even baggy garments not properly clipped to the legs often obscure the pedal reflectors.

In carrying out the principles of the present invention, we provide the new form of side safety reflector means for bicycles that will clearly reflect rays of light from either side of the bicycle, unobscured by the legs and clothing of the rider.

An advantage of the present invention is the improvement in the safety of bicycles by the provision of reflectors on the bicycle having reflective surfaces on opposite sides of the reflector and by mounting the reflectors to readily reflect rays of light from either side of the bicycle without interference from the rider.

Another advantage in the invention is the provision of a bicycle reflector having reflective surfaces on each side of the reflector and adapted to be clamped to the bicycle to be viewed without interruption from either side of the bicycle.

A further advantage in the invention is in the provision of a simple and improved form of reflector arrangement and mounting therefor ruggedly mounting the reflector to the bicycle to be readily viewed without interference.

Still another advantage of the invention is attained by mounting two acrylic prismatic reflectors in a common mounting member, with their internal faceted reflective faces facing each other, and sealing the reflectors to the mounting member, which also permanently retains the reflectors thereto.

A still further advantage of the invention is in the provision of a safety reflection system for bicycles utilizing double sided acrylic reflectors and clamping the reflectors on the top bar of the bicycle adjacent the steering post and on the rear angular bar of the bicycle forming a mounting for the bicycle seat for reflecting light rays from either side of the bicycle.

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure.

DESCRIPTION OF PREFERRED EMBODIMENT OF THE INVENTION

Figure 1:
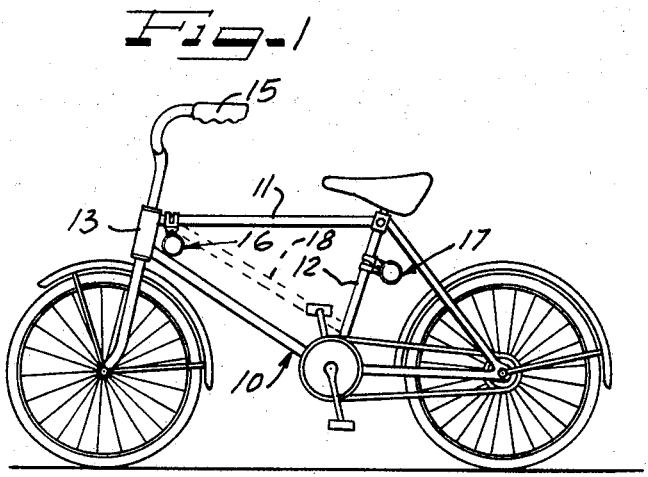
FIG. 1 is a view in side elevation of a men's type of bicycle, illustrating a safety reflector arrangement in accordance with the principles of the present invention.

In the embodiment of the invention illustrated in the drawings, we have diagrammatically shown in FIG. 1 a well-known form of men's bicycle including a frame 10 having a horizontal top bar 11 extending from a rearwardly inclined rear bar 12, forming a socket for the seat post, to a column or post 13 for handlebars 15, as is conventional in bicycle construction. We have also shown reflectors 16 and 17, respectively, clamped to the top bar 11 adjacent the steering post and to the angularly extending rear bar 12 adjacent the seat of the bicycle. The locations of the reflectors, of course, are varied for women's bicycles, but may be towards the front and rear of the bicycle where they will be clearly visible from the sides of the bicycle and effectively send out warning rays of light by reflection of the headlights of an automotive vehicle, or from other sources of light. The bar of a women's bicycle to which the reflector 16 may be clamped is diagrammatically illustrated by broken lines in FIG. 1 and indicated by reference numeral 18.

The reflectors 16 and 17 are each of the same construction and are clamped to the bar of the bicycle in a similar manner except in the present instance, the front reflector 16 may be amber and the rear reflector 17 may be red in order to attract the attention to the bicycle and enhance the safety features of the reflectors, although both reflectors may be of the same color or of other accepted colors and the order of colors may be reversed if desired. One reflector only and its mounting on the bicycle, therefore, need herein be shown and described in detail.

Figure 2:
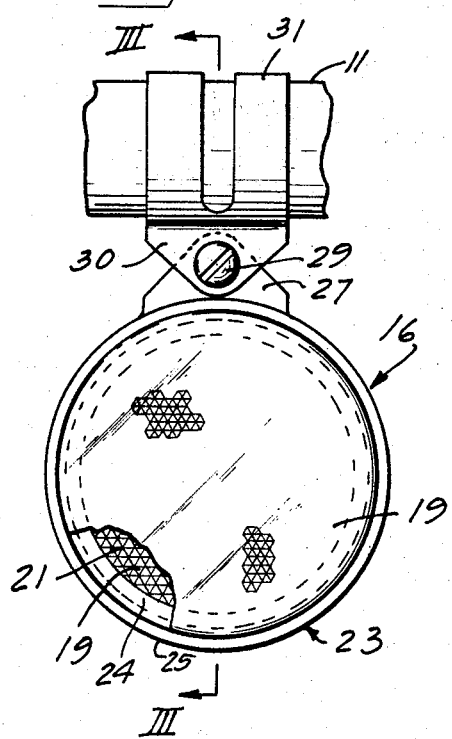
FIG. 2 is a plan view of a safety reflector constructed in accordance with the principles of the present invention with certain parts of a reflector broken away and showing the reflector clamped to depend from the top bar of a men's bicycle, to readily reflect light from either side of the bicycle.
Figure 3:
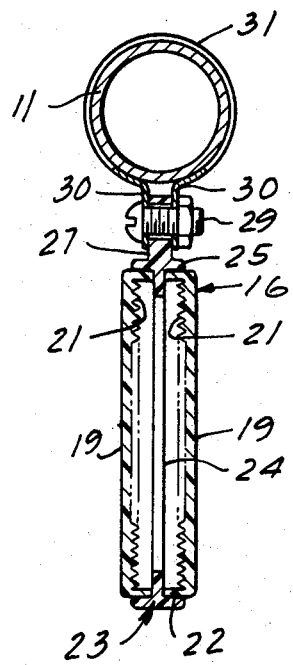
FIG. 3 is a transverse sectional view taken through the reflector and clamp and bicycle bar substantially along line III—III of FIG. 2.

The reflector 16 as shown in FIGS. 2 and 3, is in the form of two oppositely facing reflex reflectors 19 of a similar form, made from an acrylic plastic material and having internal facets 21 extending inwardly therefrom and converging into peaks at their inner ends, to provide a multiplicity of faceted prismatic reflective surfaces, in a manner common to acrylic reflectors, and no part of the present invention so not shown or described in detail herein.

Each reflector 19 has a marginal rim 22 extending thereabout and defining the margin of the facets and a means for mounting the reflector to a mount 23. The rims 22 of the reflectors 19 each terminate in a common plane to facilitate ready sealing of the internal faceted reflective faces of the reflector.

The mount 23 may be made from a plastic material known to the trade as A.B.S. which is an acrylonitrile-butadine-styrene copolymer frequently sold under the trade name "Cycolac." Said mount 23 is shown as being of a ring-like form having a center flat ring 24 and annular flanges 25 extending from opposite sides of said ring, the inner margins of which fit about the rims 22 of the reflectors 19. A mounting tab 27 extends upwardly from the juncture of the flanges 25 and is drilled or otherwise apertured to accommodate a bolt 29 to pass therethrough. The bolt 29 may be a clamping nut and bolt and is shown as extending through apertured portions of depending ears 30 of a clamp 31 to clamp the reflector to depend from the bar 11.

Since the reflector is made from an acrylic plastic and the mounting is made from a plastic known to the trade as A.B.S., the reflectors 19 may be effectively carried by the mount and sealed to the flanges 25 by a conventional form of sonic sealing in a manner similar to that shown and described in an application Ser. No. 140,148, filed May 4, 1971 by Gerald Golden, Charles Wrobel, Jr. and Walter Dian, so not herein shown or described further.

The opposed facing facets 21 of the reflectors 19 being permanently sealed by sonic sealing permanently mounting the reflectors in the mount 23, are thus hermetically sealed by the mounting means to prevent the accumulation of dust on the internal faceted reflector faces for the life of the reflector, by the simple operation of sonically sealing the reflector to the mounting, which not only forms a permanent mounting for the oppositely faceted reflector faces, but also enhances the reflectivity thereof.

The clamp 31 may be of metal in the form of a strip of metal formed into a split generally cylindrical form with the tabs 30 depending from adjacent ends of the split portion thereof and affording a means for effectively clamping the respective reflectors 16 and 17 to the bars 11 and 12 of the bicycle, as shown in FIG. 1.

While we have shown a particular location for the reflectors on the bars 11 and 12, it should be understood that this location may be changed, but in the present location, the reflectors are not interferred with by front and rear reflectors on the bicycle, and there is less likelihood of the bicycle rider obscuring the reflectors by the legs or clothes, except perhaps one reflector may be momentarily obscurbed while mounting or demounting from the bicycle.

The reflectors are thus supported in most efficient positions for reflecting rays of light projected thereon by automotive vehicle headlights or other light sources coming from either side of the bicycle, are out of the way of the rider both while riding and mounting or dimounting from the bicycle and provide a simplified form of safety reflective means for bicycles more than satisfying present-day safety requirements.

We claim:

1. A bicycle reflector assembly having oppositely facing aligned reflective surfaces comprising:

two aligned oppositely facing reflex acrylic reflectors of the same size and having internal faceted prismatic reflective faces and marginal rims extending thereabout and terminating in a common plane, mounting means mounting said reflectors with their prismatic reflective faces facing each other and sealing the prismatic faces of said reflectors, comprising: a plastic ring of an acrylonitrile-butadine-styrene copolymer having an axial flange engaging the edges of said marginal rims and having aligned annular flanges extending from opposite sides of said axial flange having internal diameters corresponding to the external diameters of said marginal rims, and adapted to snugly receive said rims and form a mounting therefor, and sonic sealing means sealing said rims to said axial and annular flanges and securing said reflectors to said mounting means and preventing the ingress of dust and moisture to said faceted prismatic reflective faces.

2. The reflector assembly of claim 1, including an integral tab extending radially of said flanges and formed integrally therewith, said tab having an apertured portion accommodating said reflector to be clamped to the bar of a bicycle and the like.

3. The reflector of claim 2, wherein a clamp is secured to said connecting tab and is adapted to be clamped to the bar of a bicycle in visible relation from opposite sides of the bicycle and free from the person riding the bicycle.

4. The bicycle reflector means of claim 3, including a plurality of reflectors, mounting means and clamps adapted to clamp said reflectors to the front part of the bicycle frame adjacent the handlebars, and to the rear part of the bicycle frame beneath the seat to project rearwardly therefrom and clearly visible from both sides of the bicycle, wherein one of said side reflectors is amber and the other of said side reflectors is red to enhance the warning effect of said reflectors.

* * * * *